(12) United States Patent
Jiao

(10) Patent No.: US 9,516,715 B2
(45) Date of Patent: Dec. 6, 2016

(54) DRIVING CIRCUIT AND LIGHT EMITTING DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Weijun Jiao, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 191 days.

(21) Appl. No.: 14/407,523

(22) PCT Filed: Sep. 30, 2013

(86) PCT No.: PCT/CN2013/084742
§ 371 (c)(1),
(2) Date: Dec. 12, 2014

(87) PCT Pub. No.: WO2015/000235
PCT Pub. Date: Jan. 8, 2015

(65) Prior Publication Data
US 2016/0270160 A1    Sep. 15, 2016

(30) Foreign Application Priority Data
Jul. 4, 2013    (CN) .......................... 2013 1 0279633

(51) Int. Cl.
*H05B 33/08*    (2006.01)
(52) U.S. Cl.
CPC ........ *H05B 33/083* (2013.01); *H05B 33/0812* (2013.01)

(58) Field of Classification Search
CPC .............. H05B 33/083; H05B 33/0827; H05B 33/0812; H05B 33/0815; H05B 33/08
See application file for complete search history.

(56) References Cited

U.S. PATENT DOCUMENTS

| 2009/0045788 A1 | 2/2009 | Williams et al. |
| 2009/0212721 A1* | 8/2009 | Maruyama ......... H05B 33/0812 315/307 |

FOREIGN PATENT DOCUMENTS

| CN | 1449113 | 10/2003 |
| CN | 101425429 | 5/2009 |

(Continued)

OTHER PUBLICATIONS

International Search Report and Written Opinion issued in corresponding International Application No. PCT/CN2013/084742 dated Apr. 16, 2014.

(Continued)

*Primary Examiner* — Douglas W Owens
*Assistant Examiner* — Jonathan Cooper
(74) *Attorney, Agent, or Firm* — BakerHostetler LLP1

(57) ABSTRACT

A light emitting device and driving circuit for driving a light emitting circuit in the light emitting device including a plurality of light emitting elements connected in series. The driving circuit includes a first thyristor, a first current limiting resistor, a current detecting resistor, a controllable switch and a voltage dividing circuit. An end of the first thyristor is connected to ground, and another end of the first thyristor is connected to a driving end providing a driving voltage via the first current limiting resistor. The controllable switch has one end connected to the light emitting circuit, another end connected to ground via the current detecting resistor, and a controlling end connected to a first node between the first thyristor and the first current limiting resistor. The voltage dividing circuit has an end connected to (Continued)

the controlling end and has another end connected to a second node between the current detecting resistor and controllable switch.

20 Claims, 3 Drawing Sheets

(56) References Cited

FOREIGN PATENT DOCUMENTS

| | | |
|---|---|---|
| CN | 101778513 | 7/2010 |
| CN | 101843176 | 9/2010 |
| CN | 201577223 | 9/2010 |
| CN | 103327697 | 9/2013 |
| WO | 2008050779 | 5/2008 |

OTHER PUBLICATIONS

Text of the Notification of the First Office Action, App. No. 2013102796336, Sep. 24, 2014.

* cited by examiner

-PRIOR ART-

DRIVING CIRCUIT AND LIGHT EMITTING DEVICE

CROSS-REFERENCE TO RELATED APPLICATION

This application is the U.S. national phase of PCT Application No. PCT/CN2013/084742 filed on Sep. 30, 2013, which claims priority to Chinese Patent Application No. 201310279633.6 filed on Jul. 4, 2013, the disclosures of which are incorporated in their entirety by reference herein.

TECHNICAL FIELD

The present disclosure relates to the driving technique for a light emitting diode (LED) circuit, in particular to a driving circuit and a light emitting device.

BACKGROUND

Light emitting diodes (LEDs) have been widely used in all aspects of industry and everyday life because of its small size, high efficiency and other characteristics.

FIG. 1 shows a common LED light emitting device. As show in FIG. 1, the LED light emitting device includes a light emitting circuit, a controllable switch Q1, a current detecting resistor Rsen, a thyristor U1 and a first current limiting resistor R1, wherein:

the light emitting circuit includes a plurality of LEDs D1, . . . Dn connected in series; where n is an integer greater than one;

an end of the thyristor U1 is connected to ground, and another end is connected to a driving end Vdrive providing a driving voltage via the first current limiting resistor R1;

a source electrode of the controllable switch Q1 is connected to the light emitting circuit, and a drain electrode of the controllable switch is connected to ground via the resistor Rsen, and a controlling end (gate electrode) of the controllable switch is connected to a first node X located between the first thyristor U1 and the first current limiting resistor R1.

However, there is a defect that protection for the driving circuit is not enough in the above LED light emitting device when an LED short circuit occurs. The description will be given below in connection with its work process as follows.

As shown in FIG. 1, the driving voltage Vdrive provides an ON voltage to turn on Q1, thereby a current flows through D1~Dn and Rsen; a voltage drop will be generated when the current flows through Rsen; when a voltage drop across Rsen is greater than a threshold (e.g. 2.5 V), the thyristor U1 is turned on, thereby lowering the gate voltage of Q1, so that Q1 is turned off, that is, the LED current is turned off. After Q1 is turned off, the voltage drop across Rsen is 0, therefore the thyristor U1 is turned off again, making that Q1 is turned on again by the driving voltage Vdrive. Above process is repeated so that the voltage drop across Rsen can be maintained at 2.5 V.

However, there is another problem that an efficiency of the circuit is low in the circuit described above, which will be explained as follows.

Assumed that a total voltage drop of D1 . . . Dn is 30 V, Vdrive is 10 V, a reference voltage $V_{Ref}$ of U1 is 2.5 V, the LED current is 250 mA, and then the resistor Rsen is 10 Ohms.

Generally, an operating current of U1 is 1~100 mA. If the operating current of U1 is taken to be 50 mA, R1=Vdrive/50 mA=200 Ohms.

A total power of the circuit shown in FIG. 1 consists of the following components:

the power of R1: $V^2$drive/R1=100/200=0.5 W;

the power of the light emitting circuit: 30V (the total voltage drop of D1 . . . Dn)*250 mA (the current of the light emitting circuit)=7.5 W;

the power of Rsen: 2.5 V (voltage drop of Rsen)*250 mA (the current of the light emitting circuit)=0.625 W.

Therefore, a circuit efficiency of the circuit shown in FIG. 1 is the power of the light emitting circuit/the total power of the circuit=7.5/8.625, approximately 87%.

The greater the current of the light emitting circuit is, the lower the circuit efficiency is.

Above is described with taking the LED light emitting circuit as an example, however, it should be understood that, there are same problems in similar circuits composed of other light emitting elements, which will not be described herein.

SUMMARY

An object of embodiments of the present disclosure is to provide a driving circuit and a light emitting device, to reduce the power consumption of the driving circuit and improve the circuit efficiency.

To achieve the above object, an embodiment of the present disclosure provides a driving circuit, for driving a light emitting circuit including a plurality of light emitting elements connected in series, wherein the driving circuit includes a first thyristor, a first current limiting resistor, a current detecting resistor, a controllable switch and a voltage dividing circuit, wherein:

an end of the first thyristor is connected to ground, and another end of the first thyristor is connected to a driving end providing a driving voltage via the first current limiting resistor;

an end of the controllable switch is connected to the light emitting circuit, and another end of the controllable switch is connected to ground via the current detecting resistor, and a controlling end of the controllable switch is connected to a first node located between the first thyristor and the first current limiting resistor;

a voltage drop of the voltage dividing circuit is less than a reference voltage of the first thyristor, an end of the voltage dividing circuit is connected to the controlling end of the first thyristor, and another end of the voltage dividing circuit is connected to a second node located between the current detecting resistor and the controllable switch.

In the above driving circuit, the light emitting elements may be light emitting diodes (LEDs).

In the above driving circuit, the voltage dividing circuit may be a voltage source having an end voltage which is constant but less than the reference voltage.

In the above driving circuit, the voltage dividing circuit may be a voltage source having an end voltage which is adjustable.

In the above driving circuit, the voltage dividing circuit may include:

a voltage dividing resistor, an end of which is connected to the controlling end of the first thyristor and another end of which is connected to the second node located between the current detecting resistor and the controllable switch;

a voltage maintaining circuit, which is connected to the voltage dividing resistor and maintains a voltage difference across the voltage dividing resistor at the voltage drop.

In the above driving circuit, the voltage maintaining circuit may include:

a second current limiting resistor;

an adjustable resistor, an end of which is connected to the second node via the voltage dividing resistor, and another end of which is connected to the driving end via the second current limiting resistor;

a second thyristor, which is connected in parallel with a series circuit formed by the voltage dividing resistor and the adjustable resistor, and a controlling end of which is connected to a third node W located between the second current limiting resistor and the resistor R9.

In order to better achieve the above object, an embodiment of the present disclosure also provides a light emitting device, provided with a light emitting circuit including a plurality of light emitting elements connected in series, wherein the light emitting device further includes any of the above driving circuit.

Embodiments of the present disclosure at least achieve the following advantages:

In the driving circuit according to an embodiment of the present disclosure, the voltage dividing circuit, of which the voltage drop is less than the reference voltage of the thyristor, is connected in series between the controlling end of the thyristor and the current detecting resistor. The voltage all of which was originally applied to Rsen is shared by Rsen and the added voltage dividing circuit, therefore the voltage drop across Rsen is reduced, causing the power consumption to be reduced. Meanwhile, the power consumption brought by adding the voltage dividing circuit is relatively small, so that the overall power consumption of the driving circuit is reduced and the circuit efficiency is improved.

DETAILED DESCRIPTION

In a driving circuit and a light emitting device according to an embodiment of the present disclosure, by connecting a voltage dividing circuit of which a voltage drop is less than a reference voltage of a thyristor in series between a controlling end of the thyristor and a current detecting resistor, a voltage drop across the current detecting resistor is reduced, so that an object of reducing a power consumption of the driving circuit is achieved by reducing a power consumption of the current detecting resistor.

To better understand embodiments of the present disclosure, firstly, a thyristor involved in the embodiments of the present disclosure is briefly described below.

A thyristor, referred to as a thyristor rectifier element, is a semiconductor device having three PN junctions. It has small-volume, relatively simple-structure, powerful and other characteristics, and is one of commonly used semiconductor devices.

Three electrodes are led-out respectively from the three PN junctions of the thyristor: an anode, a control electrode and a cathode K. Compared to a diode, the thyristor further has the control electrode.

The thyristor used in an embodiment of the present disclosure has the following characteristics: when a voltage applied to the control electrode of the thyristor is greater than a threshold (i.e. the reference voltage of the thyristor), the thyristor is turned on; when the voltage applied to the control electrode of the thyristor is less than a threshold (i.e. the reference voltage of the thyristor), the thyristor is turned off.

Figure 1:
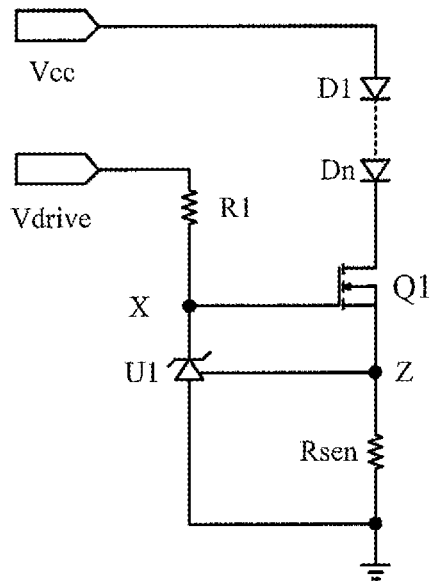
FIG. 1 is a diagram showing a circuit of a conventional LED light emitting device.
Figure 2:
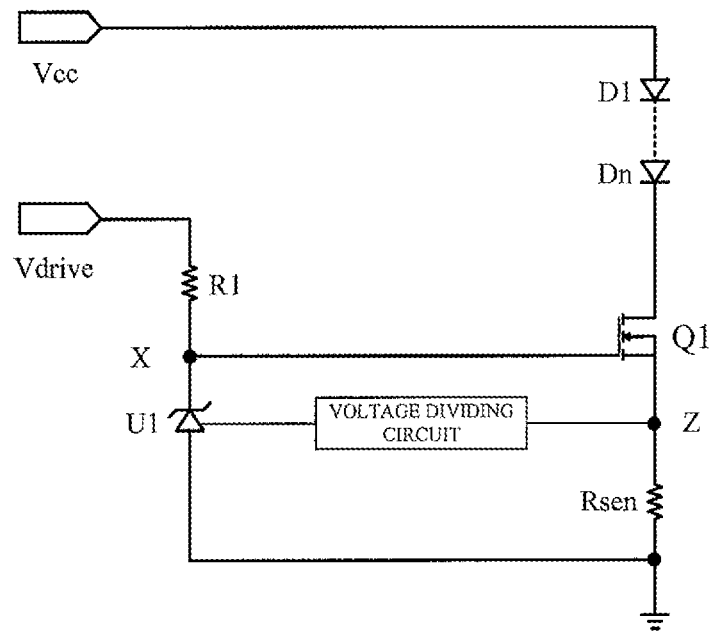
FIG. 2 is a diagram showing a circuit of a driving circuit according to an embodiment of the present disclosure.

A driving circuit according to an embodiment of the present disclosure is used for driving a light emitting circuit including a plurality of light emitting elements connected in series (which are LEDs D1 . . . Dn in FIG. 2, but may also be other types of light emitting elements). As shown in FIG. 2, the driving circuit includes a first thyristor U1, a first current limiting resistor R1, a current detecting resistor Rsen, a controllable switch Q1 and a voltage dividing circuit, wherein:

an end of the first thyristor U1 is connected to ground, and another end of the first thyristor U1 is connected to a driving end Vdrive providing a driving voltage via the first current limiting resistor R1;

an end of the controllable switch Q1 is connected to the light emitting circuit, and another end of the controllable switch Q1 is connected to ground via the current detecting resistor Rsen, and a controlling end of the controllable switch Q1 is connected to a first node X located between the first thyristor U1 and the first current limiting resistor R1;

a voltage drop of the voltage dividing circuit is less than a reference voltage of the first thyristor U1, an end of the voltage dividing circuit is connected to the controlling end of the first thyristor U1, and another end of the voltage dividing circuit is connected to a second node Z located between the current detecting resistor Rsen and the controllable switch Q1.

In the driving circuit according to the embodiment of the present disclosure, the voltage dividing circuit, of which the voltage drop is less than the reference voltage of the thyristor, is connected in series between the controlling end of the thyristor and the current detecting resistor. The voltage all of which was originally applied to Rsen is shared by Rsen and the added voltage dividing circuit, therefore the voltage drop across Rsen is reduced, causing the power consumption to be reduced. Meanwhile, the power consumption brought by adding the voltage dividing circuit is relatively small, so that the overall power consumption of the driving circuit is reduced and the circuit efficiency is improved.

In the embodiment of the present disclosure, in order to reduce the overall power consumption of the driving circuit, the power consumption of the added voltage dividing circuit should be less than a reduction amount of the power consumption of Rsen, which will be described as follows.

Assumed that the reference voltage of the first thyristor is U, and the voltage drop of the voltage dividing circuit is xU (where 0<x<1), then the reduction amount of the power consumption of Rsen is:

$$U^2/\text{Rsen} - (U-xU)^2/\text{Rsen} = (2x-x^2)U^2/\text{Rsen}$$

In other words, as long as the power consumption of the voltage dividing circuit is less than $(2x-x^2)U^2/\text{Rsen}$, the overall power consumption of the driving circuit will be reduced.

In a specific embodiment of the present disclosure, the voltage dividing circuit can be implemented by many methods. Below several possible methods are described in detail as follows.

<First Method>

In the first method, a voltage source, an end voltage of which is constant but less than the reference voltage, is directly used as the voltage dividing circuit, which will be described as follows.

In the embodiment of the present disclosure, the voltage source may be a voltage source the end voltage of which is adjustable or constant. That the voltage source is used as the voltage dividing circuit has beneficial effect of flexibility, which is that voltage sources with different voltages can be selected as required by the LED circuit, or the end voltage can be adjusted so as to satisfy the requirements.

Assumed that the reference voltage of the first thyristor is 2.5 V, the LED current is 250 mA, the resistor Rsen is 5 Ohms, then the end voltage of the voltage source can be set to be 1.25 V; and when the LED current is increased to 300 mA, the end voltage of the voltage source can be adjusted to 1.0 V.

Therefore, at the same time of reducing the power consumption of the driving circuit, the use of the voltage source having an adjustable end voltage may still meet needs of different occasions.

<Second Method>

In the first method, the voltage source is used as the voltage dividing circuit; however, in the second method according to an embodiment of the present disclosure, the voltage dividing circuit is achieved by combination of a resistor and a voltage maintaining circuit. However, if it is understood from a broad perspective, the combination of the resistor and the voltage maintaining circuit may also be regarded as a voltage source.

Figure 3:
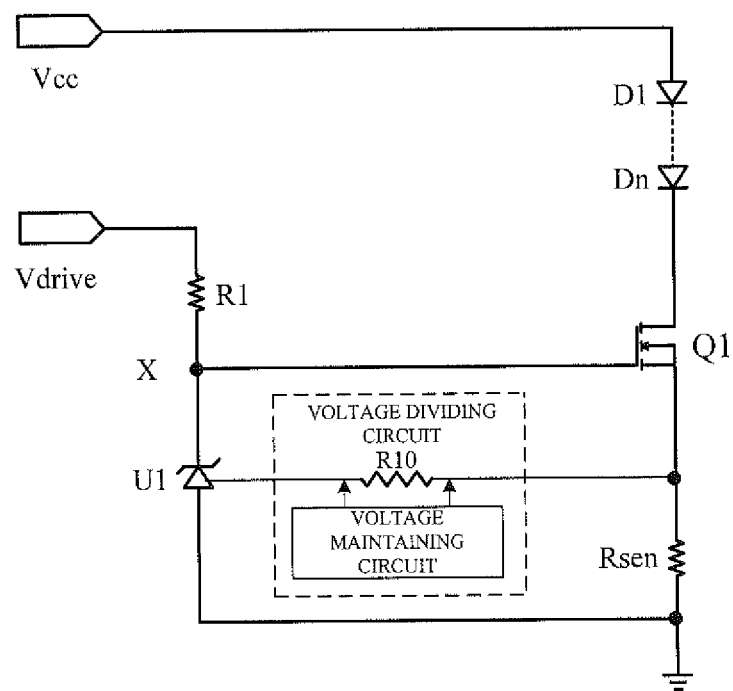
FIG. 3 is a diagram showing a circuit of an implementation of a voltage dividing circuit according to an embodiment of the present disclosure.

As shown in FIG. 3, the voltage dividing circuit includes:

a resistor R10 (voltage dividing resistor), an end of which is connected to the controlling end of the first thyristor U1 and another end of which is connected to the second node located between the current detecting resistor Rsen and the controllable switch Q1;

a voltage maintaining circuit, which is connected to the resistor R10 and maintains a voltage drop across the resistor R10 to be the voltage drop.

In the second method, by combination of the resistor and the voltage maintaining circuit, the voltage across R10 is ensured to be the voltage drop. Therefore, the voltage drop of Rsen is a difference between U and the voltage across R10, thereby reducing the power consumption of Rsen, so as to reduce the overall power consumption of the driving circuit.

In the second method, it needs to provide a voltage maintaining circuit. However, the stability of the voltage maintaining circuit will affect the stability of the light emitting circuit, which will be described below.

The voltage drop of Rsen is the difference between the reference voltage U of the first thyristor and the voltage across R10, therefore, if the voltage across R10 is unstable, the voltage drop of Rsen will be caused to be unstable, so that the LED current will be caused to be unstable either.

Figure 4:
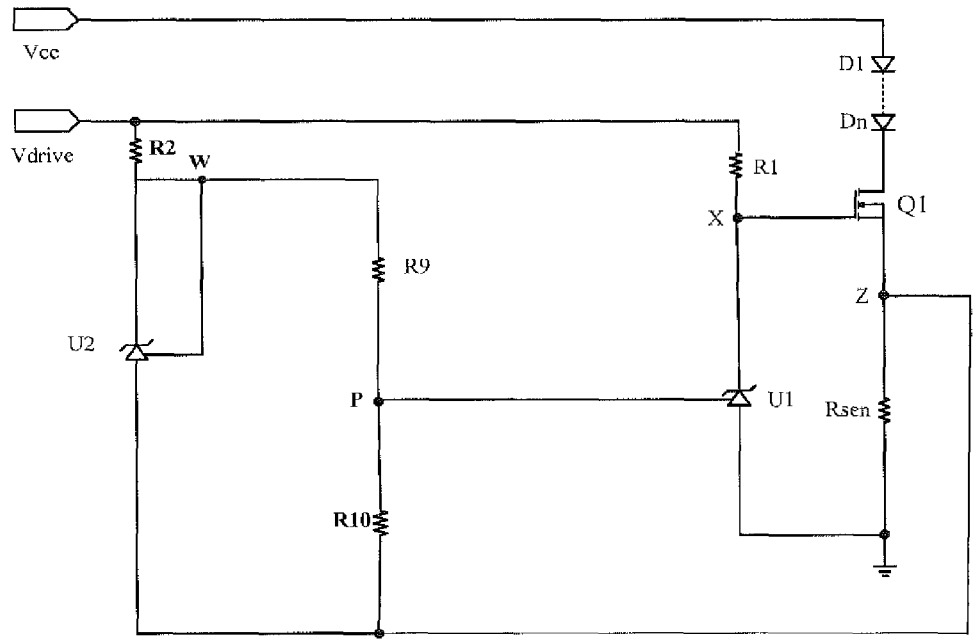
FIG. 4 is a diagram showing a circuit of an LED light emitting circuit using the voltage dividing circuit shown in FIG. 3.

Therefore, in order to ensure the voltage drop across R10 to be stable, so as to make the LED remain at a constant-current state, a particular voltage maintaining circuit according to an embodiment of the present disclosure, as shown in FIG. 4, includes:

a second current limiting resistor R2;

a resistor R9 (adjustable resistor), an end of which is connected to the second node Z via the resistor R10, and another end of which is connected to the driving end Vdrive via the second current limiting resistor R2;

a second thyristor U2, which is connected in parallel with a series circuit formed by R9 and R10, and a controlling end of which is connected to a third node W located between the second current limiting resistor R2 and the resistor R9.

The power consumption of the above driving circuit will be analyzed as follows in conjunction with FIG. 4.

As shown in FIG. 4, when the circuit works, R2 limits the current flowing though U2, and the voltage drop between the cathode and anode of U2 is accurately limited to 2.5 V (here, an example where the reference voltage of U2 is 2.5 V is described, however, the specific value is not limited in embodiments of the present disclosure), so a sum of the voltage drops of R9 and R10 is 2.5 V, wherein their respective voltage drops are determined by their resistance ratio. And the thyristor U1 will maintain the voltages across R10 and Rsen to be 2.5 V. Therefore, in the circuit shown in FIG. 4, the voltage drop of R10 will be constant, so as to ensure the voltage drop of Rsen to be reduced as well as to be maintained constant.

Assumed that a total voltage drop of D1 . . . Dn is 30 V, Vdrive is 10 V, a reference voltage of U1 is 2.5 V, the LED current is 250 mA.

If the operating current of U2 is taken to be 5 mA, and that of U1 is taken to be 50 mA, then $R2=10V/5$ mA=2K Ohms;

$R1=10V/50$ mA=200 Ohms;

Assumed that the voltage drop of Rsen is reduced from 2.5 V to 0.5 V, because of the effect of U1, the voltage sum of the resistors R10 and Rsen is 2.5 V, then voltage across the resistor R10 is 2 V.

If R10 is taken to be 10K Ohms, the resistance of R9 is 0.5V/(2V/10000 Ohms)=2.5 K Ohms.

And since the LED current is 25 0 mA, Rsen is about 2 Ohms.

To this end, the calculation of the parameters has done. The power consumption will be analyzed as follows.

Firstly, the total power consumption includes the following parts:

the power consumption of light emitting circuit: 30V (the total voltage drop of D1 . . . Dn)*250 mA (the current of the light emitting circuit)=7.5 W;

the power of R1: $V^2drive/R1=100/200=0.5$ W;

the power of Rsen: 0.5 V (voltage drop across Rsen)*250 mA (the current of the light emitting circuit)=0.125 W;

power consumption of R2 is about: $V^2drive/R2=100/2000=0.05$ W;

the power consumption of R9 and R10 is: $2.5^2/(R9+R10)=6.25/12500=0.0005$ W;

Therefore, the total power consumption of the circuit shown in FIG. 4 is: 8.1755 W.

Therefore, the circuit efficiency of the entire circuit is: 7.5 W/8.1755 W=91.74%.

As mentioned in the background, the circuit efficiency of the conventional circuit is only about 87%. Therefore, compared to the driving circuit in the related art, the circuit efficiency of the driving circuit according to an embodiment of the present disclosure is greatly improved.

Figure 5:
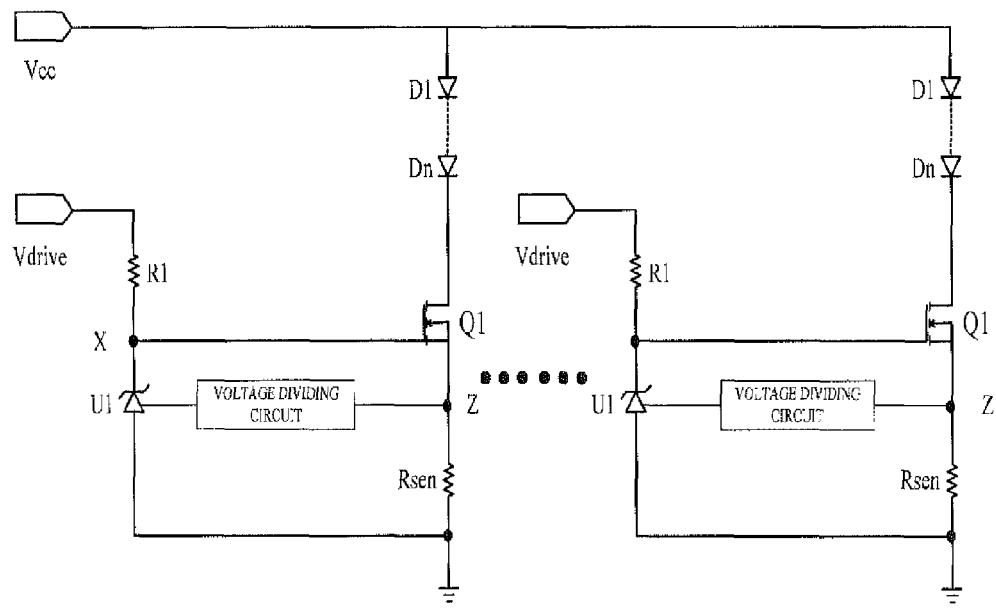
FIG. 5 is a diagram showing that a control circuit is applied to light emitting circuits connected in parallel according to an embodiment of the present disclosure.

In a specific embodiment of the present disclosure, description is given with taking one light emitting circuit as an example. However, it should be understood that the conventional light emitting circuit(s) may be formed by a plurality of circuits connected in parallel. In this case, the voltage dividing circuit as shown in FIG. 5 can be provided for each circuit. As shown in FIG. 5, since the working principle of each voltage dividing circuit is the same, which will not be further described herein.

Another embodiment of the present disclosure also provides a light emitting device, which is provided with a light emitting circuit including a plurality of light emitting elements connected in series, wherein the light emitting device further includes any of the above driving circuits.

Since the work process corresponding to each of the circuit has been previously described in detail, it will not be further described in detail herein.

The above is only preferred embodiments of the present disclosure, it should be noted that several improvements and modifications may be made for those of ordinary skill in the art without departing from the principle of the present disclosure, and also should be considered to fall within the protection scope of the present disclosure.

What is claimed is:

1. A driving circuit, for driving a light emitting circuit comprising a plurality of light emitting elements connected in series, wherein the driving circuit comprises a first thyristor, a first current limiting resistor, a current detecting resistor, a controllable switch and a voltage dividing circuit, wherein:
   an end of the first thyristor is connected to ground, and another end of the first thyristor is connected to a driving end providing a driving voltage via the first current limiting resistor;
   an end of the controllable switch is connected to the light emitting circuit, and another end of the controllable switch is connected to ground via the current detecting resistor, and a controlling end of the controllable switch is connected to a first node located between the first thyristor and the first current limiting resistor;
   a voltage drop of the voltage dividing circuit is less than a reference voltage of the first thyristor, an end of the voltage dividing circuit is connected to the controlling end of the first thyristor, and another end of the voltage dividing circuit is connected to a second node located between the current detecting resistor and the controllable switch.

2. The driving circuit according to claim 1, wherein the light emitting elements are light emitting diodes (LEDs).

3. The driving circuit according to claim 1, wherein the voltage dividing circuit is a voltage source having an end voltage which is constant but less than the reference voltage.

4. The driving circuit according to claim 2, wherein the voltage dividing circuit is a voltage source having an end voltage which is constant but less than the reference voltage.

5. The driving circuit according to claim 1, wherein the voltage dividing circuit is a voltage source having an end voltage which is adjustable.

6. The driving circuit according to claim 2, wherein the voltage dividing circuit is a voltage source having an end voltage which is adjustable.

7. The driving circuit according to claim 1, wherein the voltage dividing circuit comprises:
   a voltage dividing resistor, an end of which is connected to the controlling end of the first thyristor and another end of which is connected to the second node located between the current detecting resistor and the controllable switch;
   a voltage maintaining circuit, which is connected to the voltage dividing resistor and maintains a voltage difference across the voltage dividing resistor at the voltage drop.

8. The driving circuit according to claim 2, wherein the voltage dividing circuit comprises:
   a voltage dividing resistor, an end of which is connected to the controlling end of the first thyristor and another end of which is connected to the second node located between the current detecting resistor and the controllable switch;
   a voltage maintaining circuit, which is connected to the voltage dividing resistor and maintains a voltage difference across the voltage dividing resistor at the voltage drop.

9. The driving circuit according to claim 7, wherein the voltage maintaining circuit comprises:
   a second current limiting resistor;
   an adjustable resistor, an end of which is connected to the second node via the voltage dividing resistor, and another end of which is connected to the driving end via the second current limiting resistor;
   a second thyristor, which is connected in parallel with a series circuit formed by the voltage dividing resistor and the adjustable resistor, and a controlling end of which is connected to a third node located between the second current limiting resistor and the adjustable resistor.

10. The driving circuit according to claim 8, wherein the voltage maintaining circuit comprises:
   a second current limiting resistor;
   an adjustable resistor, an end of which is connected to the second node via the voltage dividing resistor, and another end of which is connected to the driving end via the second current limiting resistor;
   a second thyristor, which is connected in parallel with a series circuit formed by the voltage dividing resistor and the adjustable resistor, and a controlling end of which is connected to a third node located between the second current limiting resistor and the adjustable resistor.

11. A light emitting device, provided with a light emitting circuit comprising a plurality of light emitting elements connected in series, wherein the light emitting device further comprises a driving circuit, for driving the light emitting circuit, wherein the driving circuit comprises a first thyristor, a first current limiting resistor, a current detecting resistor, a controllable switch and a voltage dividing circuit, wherein:
   an end of the first thyristor is connected to ground, and another end of the first thyristor is connected to a driving end providing a driving voltage via the first current limiting resistor;
   an end of the controllable switch is connected to the light emitting circuit, and another end of the controllable switch is connected to ground via the current detecting resistor, and a controlling end of the controllable switch is connected to a first node located between the first thyristor and the first current limiting resistor;
   a voltage drop of the voltage dividing circuit is less than a reference voltage of the first thyristor, an end of the voltage dividing circuit is connected to the controlling end of the first thyristor, and another end of the voltage dividing circuit is connected to a second node located between the current detecting resistor and the controllable switch.

12. The light emitting device according to claim 11, wherein the light emitting elements are light emitting diodes (LEDs).

13. The light emitting device according to claim 11, wherein the voltage dividing circuit is a voltage source having an end voltage which is constant but less than the reference voltage.

14. The light emitting device according to claim 12, wherein the voltage dividing circuit is a voltage source having an end voltage which is constant but less than the reference voltage.

15. The light emitting device according to claim 11, wherein the voltage dividing circuit is a voltage source having an end voltage which is adjustable.

16. The light emitting device according to claim 12, wherein the voltage dividing circuit is a voltage source having an end voltage which is adjustable.

17. The light emitting device according to claim 11, wherein the voltage dividing circuit comprises:
    a voltage dividing resistor, an end of which is connected to the controlling end of the first thyristor and another end of which is connected to the second node located between the current detecting resistor and the controllable switch;
    a voltage maintaining circuit, which is connected to the voltage dividing resistor and maintains a voltage difference across the voltage dividing resistor at the voltage drop.

18. The light emitting device according to claim 12, wherein the voltage dividing circuit comprises:
    a voltage dividing resistor, an end of which is connected to the controlling end of the first thyristor and another end of which is connected to the second node located between the current detecting resistor and the controllable switch;
    a voltage maintaining circuit, which is connected to the voltage dividing resistor and maintains a voltage difference across the voltage dividing resistor at the voltage drop.

19. The light emitting device according to claim 17, wherein the voltage maintaining circuit comprises:
    a second current limiting resistor;
    an adjustable resistor, an end of which is connected to the second node via the voltage dividing resistor, and another end of which is connected to the driving end via the second current limiting resistor;
    a second thyristor, which is connected in parallel with a series circuit formed by the voltage dividing resistor and the adjustable resistor, and a controlling end of which is connected to a third node located between the second current limiting resistor and the adjustable resistor.

20. The light emitting device according to claim 18, wherein the voltage maintaining circuit comprises:
    a second current limiting resistor;
    an adjustable resistor, an end of which is connected to the second node via the voltage dividing resistor, and another end of which is connected to the driving end via the second current limiting resistor;
    a second thyristor, which is connected in parallel with a series circuit formed by the voltage dividing resistor and the adjustable resistor, and a controlling end of which is connected to a third node located between the second current limiting resistor and the adjustable resistor.

* * * * *